(12) United States Patent
Takishima

(10) Patent No.: US 6,515,947 B1
(45) Date of Patent: Feb. 4, 2003

(54) OPTICAL DISC DRIVE

(75) Inventor: Suguru Takishima, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/393,278

(22) Filed: Sep. 10, 1999

(30) Foreign Application Priority Data

Sep. 11, 1998 (JP) .......................................... 10-257712

(51) Int. Cl.$^7$ ................................................ G11B 7/00
(52) U.S. Cl. .................................. 369/44.14; 369/44.17
(58) Field of Search .......................... 369/44.12, 44.14, 369/44.15, 44.22, 44.17, 13, 13.13, 13.33

(56) References Cited

U.S. PATENT DOCUMENTS

| | | | | |
|---|---|---|---|---|
| 5,150,338 A | * | 9/1992 | Birecki et al. | 369/44.15 |
| 5,295,122 A | * | 3/1994 | Murakami et al. | 369/44.14 |
| 5,689,480 A | * | 11/1997 | Kino | 369/44.14 |
| 6,091,673 A | * | 7/2000 | Murakami et al. | 369/44.15 |
| 6,262,953 B1 | * | 7/2001 | Kahlman et al. | 369/44.15 |

FOREIGN PATENT DOCUMENTS

| | | |
|---|---|---|
| JP | 2735124 | 1/1998 |
| WO | 97/39446 | 10/1997 |

* cited by examiner

*Primary Examiner*—Nabil Hindi
(74) *Attorney, Agent, or Firm*—Greenblum & Bernstein, P.L.C.

(57) ABSTRACT

An optical disc drive is provided with a light source unit that emits a collimated light beam, and a carriage mounting an objective lens for converging the collimated light beam on a recording surface of an optical disc. The carriage is movable in a direction traversing data tracks of the optical disc. The optical disc drive is further provided with a lens actuator mounted on the carriage. The lens actuator has a movable unit capable of moving the objective lens in first and second directions, independently. The first direction is a direction of an optical axis of the objective lens, and the second direction is a direction on a plane parallel to the data recording surface of the optical disc. A magnetic head is mounted on the movable unit of the lens actuator. The magnetic head is capable of applying a magnetic field onto the data recording surface of the optical disc when data is to be recorded on the optical disc. A positional relationship between the objective lens and the magnetic head is substantially constant regardless of the moving amount of the movable unit in the first and second directions.

12 Claims, 7 Drawing Sheets

OPTICAL DISC DRIVE

BACKGROUND OF THE INVENTION

The present invention relates to an optical disc drive.

Recently, an optical disc drive whose data recording density on an optical disc reaches up to 10 Giga bits/inch$^2$ has been developed.

In such an optical disc drive, an objective lens is generally mounted on a carriage, and the carriage is made movable in a direction traversing the tracks of the data recording surface of the optical disc (i.e., the radial direction of the optical disc).

A magnetic head is also mounted on the carriage for applying magnetic field to the optical disc when data is to be recorded. In general, the magnetic head is mounted on the carriage via a relatively long elastic beam. When the disc revolves, an air flow occurs, and the magnetic head is lifted by the air flow so that the magnetic head is slightly apart from the data recording surface of the optical disc by a predetermined amount.

Such a magnetic head is located at an operation position, which is closely adjacent to the optical disc, when it applies the magnetic field thereto, while the magnetic head should be retracted (located apart from the disc by a certain amount) when the optical disc is to be inserted in or ejected from the optical disc drive so as to avoid the magnetic head from being damaged. Therefore, a mechanism for locating the magnetic head to the operation/retracted position is required in the optical disc drive.

Further, in the optical disc drive, a fine tracking is executed for locating a beam spot formed by the objective lens precisely on a track of the optical disc. For this purpose, the magnetic head as well as the objective lens may be moved in a direction traversing the tracks of the optical disc, and a mechanism therefore is required.

SUMMARY OF THE INVENTION

Recently, the mechanism for the fine tracking as well as the mechanism for retracting the magnetic head tend to be complicated, and simple mechanisms have been desired.

For the above object, according to the present invention, there is provided an optical disc drive, which is provided with: a light source unit that emits a collimated light beam; a carriage mounting an objective lens for converging the collimated light beam on a recording surface of an optical disc, the carriage being movable in a direction traversing data tracks of the optical disc; a lens actuator mounted on the carriage, the lens actuator having a movable unit, the movable unit being capable of moving the objective lens in first and second directions, independently, the first direction being a direction of an optical axis of the objective lens, the second direction being a direction on a plane parallel to the data recording surface of the optical disc; and a magnetic head mounted on the movable unit of the lens actuator, the magnetic head being capable of applying a magnetic field onto the data recording surface of the optical disc when data is to be recorded on the optical disc, wherein positional relationship between the objective lens and the magnetic head being substantially constant regardless of moving amount of the movable unit in the first and second directions.

Constructed as above, only by moving the movable unit of the lens actuator in the first direction, the objective lens as well as the magnetic head can be moved. Thus, the structure for moving the objective lens and the magnetic head can be made relatively simple, and compact in size.

Optionally, the magnetic head could be mounted on the movable unit via an elastic member.

In particular case, the magnetic head may be biased toward the data recording surface of the optical disc by the elastic member. In this case, the magnetic head is located slightly apart from the data recording surface of the optical disc due to an air flow caused by revolution of the optical disc.

Since the magnetic head is biased, the positional relationship between the magnetic head and the recording surface of the optical disc may be maintained even if the position of the data recording surface is varied while revolving.

Preferably, rough tracking is performed by moving the carriage in the direction traversing the data tracks of the optical disc, and fine tracking is performed by moving the movable unit in the plane parallel to the data recording surface of the optical disc.

Optionally, the movable unit is movable to locate the objective lens between an operation position, in the first direction, when data is recorded or reproduced, and a retracted position, in the first direction, when the data is not recorded or reproduced. The operation position is defined as a position at which the beam emitted by the light source is converged on the data recording surface, and the retracted position is defined as a position at which the objective lens is retracted from the operation position.

In this case, the magnetic head is also located at an operation position which is closely adjacent to the data recording surface of the optical disc when the objective lens is located at the operation position, and at a retracted position which is away from the data recording surface of the optical disc when the objective lens is located at the retracted position.

Further optionally, focusing may be executed by moving the movable unit in the first direction.

Still Optionally, the lens actuator may further include an actuator base mounted on the carriage, the movable unit may include a lens holder for holding the objective lens, and the lens actuator may further include a shaft standing on the actuator base, the shaft extending in a direction parallel to the optical axis of the objective lens, the lens holder being rotatably and slidably supported by the shaft.

In particular, the lens actuator may be provided with: a first electromagnetic system for moving the lens holder in the first direction; and a second electromagnetic system for rotating the lens holder about the shaft.

Further optionally, the optical axis of the objective lens may be parallel to and displaced from the central axis of the shaft by a predetermined amount.

Furthermore, the carriage may be movable in a radial direction of the optical disc.

Still optionally, the magnetic head may be mounted on the lens holder.

DESCRIPTION OF THE ACCOMPANYING DRAWINGS

DESCRIPTION OF THE EMBODIMENTS

The present invention will be described with reference to the accompanying drawings.

Figure 1:
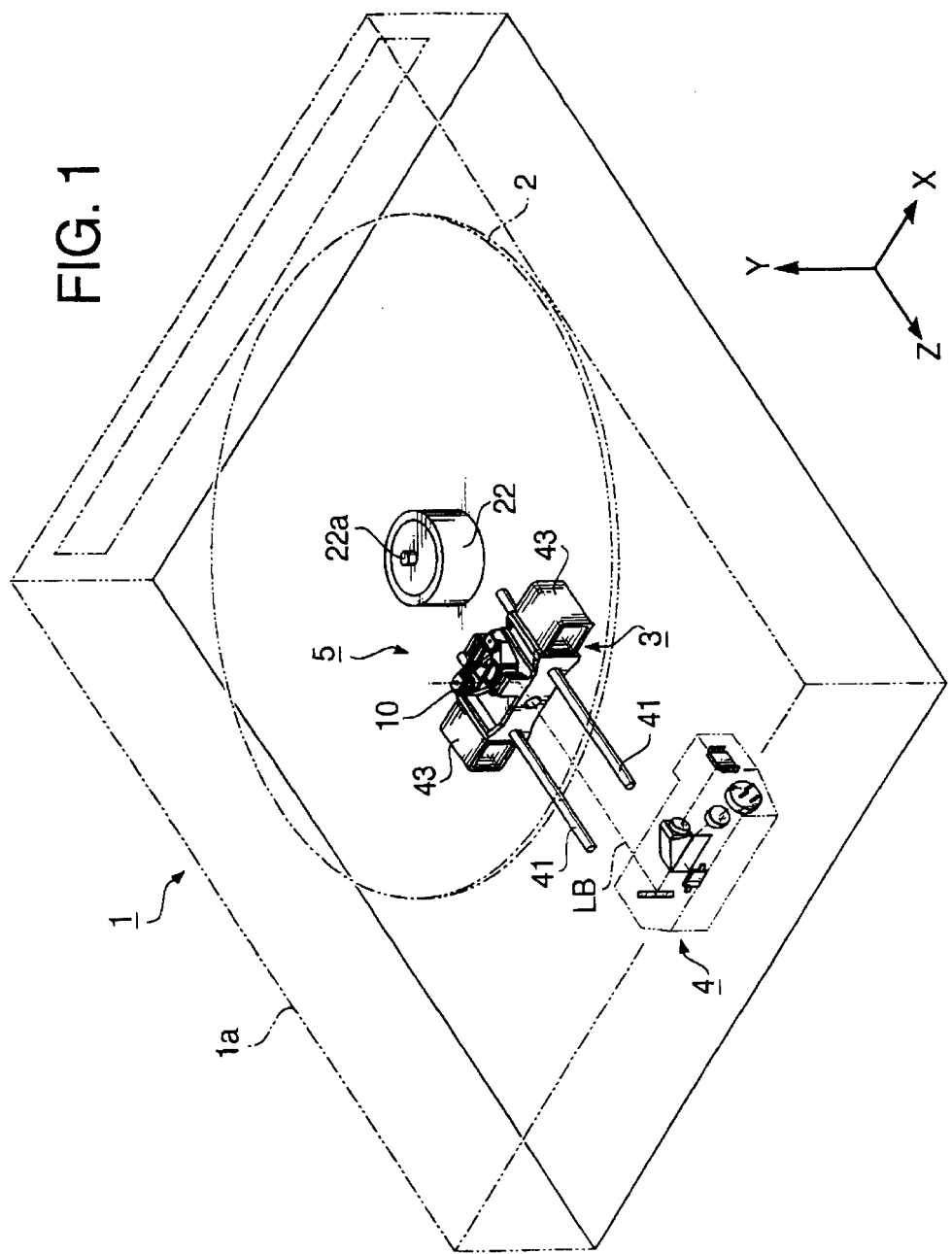
FIG. 1 is a perspective view of main components of an optical disc drive according to an embodiment of the invention.

FIG. 1 schematically shows a perspective view of basic components of an optical disc drive 1 according to an embodiment of the invention. The optical disc drive 1 has a housing 1a. Inside the housing 1a, a spindle motor 22 is provided. An optical disc 2 is rotatably supported by a spindle 22a of the spindle motor 22. The optical disc 2 is a one-sided disc, and the lower surface of the optical disc 2 is formed to be a data recording surface. For description, an X-Y-Z coordinate system is introduced, as indicated in FIG. 1, to identify a direction.

The optical disc drive 1 includes a carriage 3 which is movable linearly along the recording surface of the optical disc 2 in a radial direction thereof (in Z-axis direction), and an optical unit 4 which is fixed onto the housing 1a. On the carriage 3, a lens actuator 5 is mounted. The lens actuator 5 includes an objective lens 10 which converges a light beam emitted by the optical unit 4 onto the data recording surface 2a of the optical disc 2.

Figure 2:
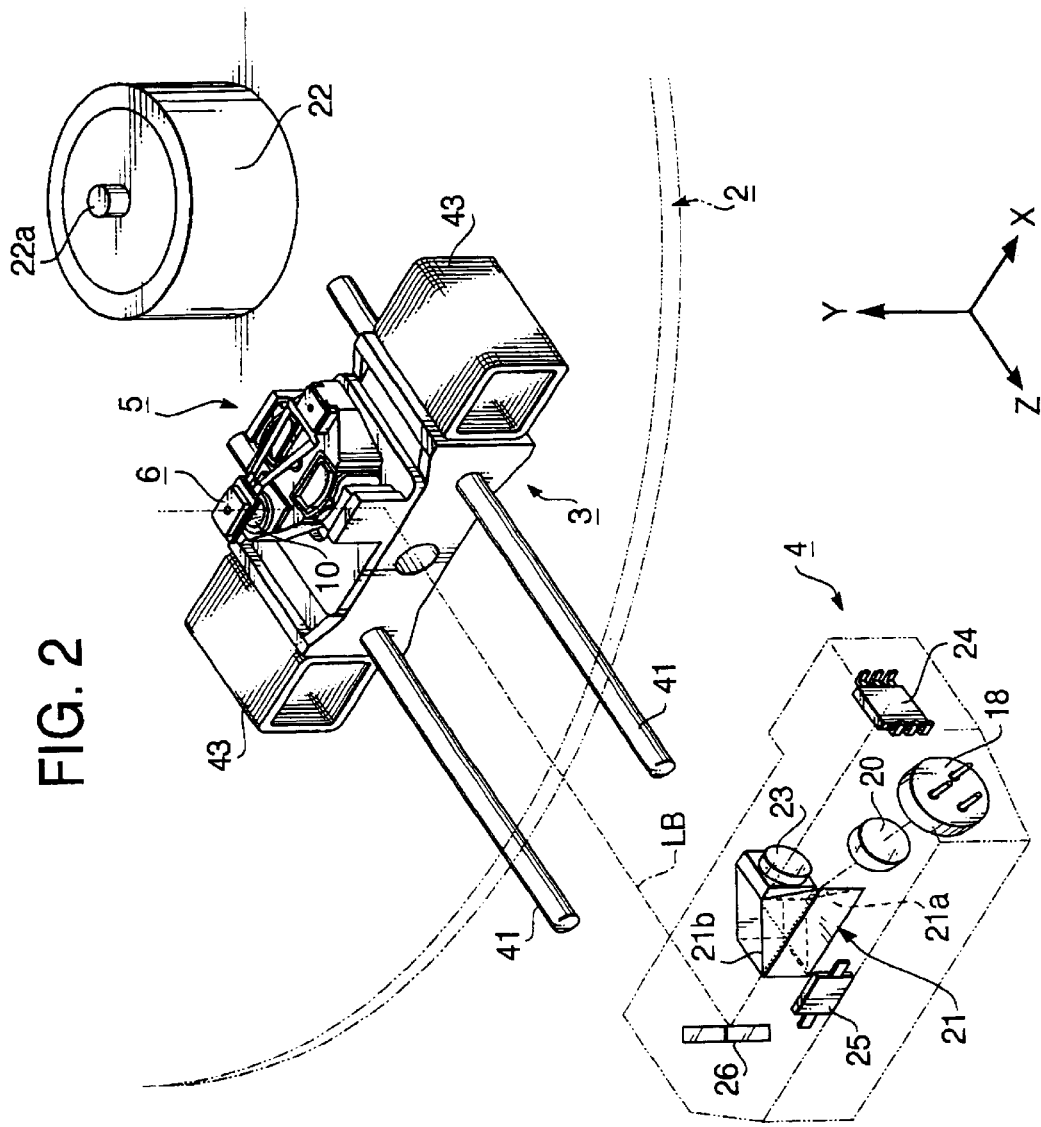
FIG. 2 is an enlarged view of part of FIG. 1.

FIG. 2 is an enlarged view of a portion of FIG. 1. The optical disc drive 1 is provided with a pair of guide rails 41 and 41 which extend in the Z-axis direction, and are fixed on the housing 1a. The carriage 3 is slidably guided by the guide rails 41 and 41 to linearly move in the Z-axis direction (i.e., the direction traversing the data tracks of the optical disc 2). Specifically, on both sides in the X-axis direction of the carriage 3, linear motor coils 43, 43 are provided. Below the linear motor coils 43 and 43, a pair of linear motor magnets (not shown) extends in the Z-axis direction. Thus, when the electrical current flows across the linear motor coils 43 and 43, the carriage 3 slides along the guide rails 41 and 41 due to the electromagnetic force.

Figure 3:
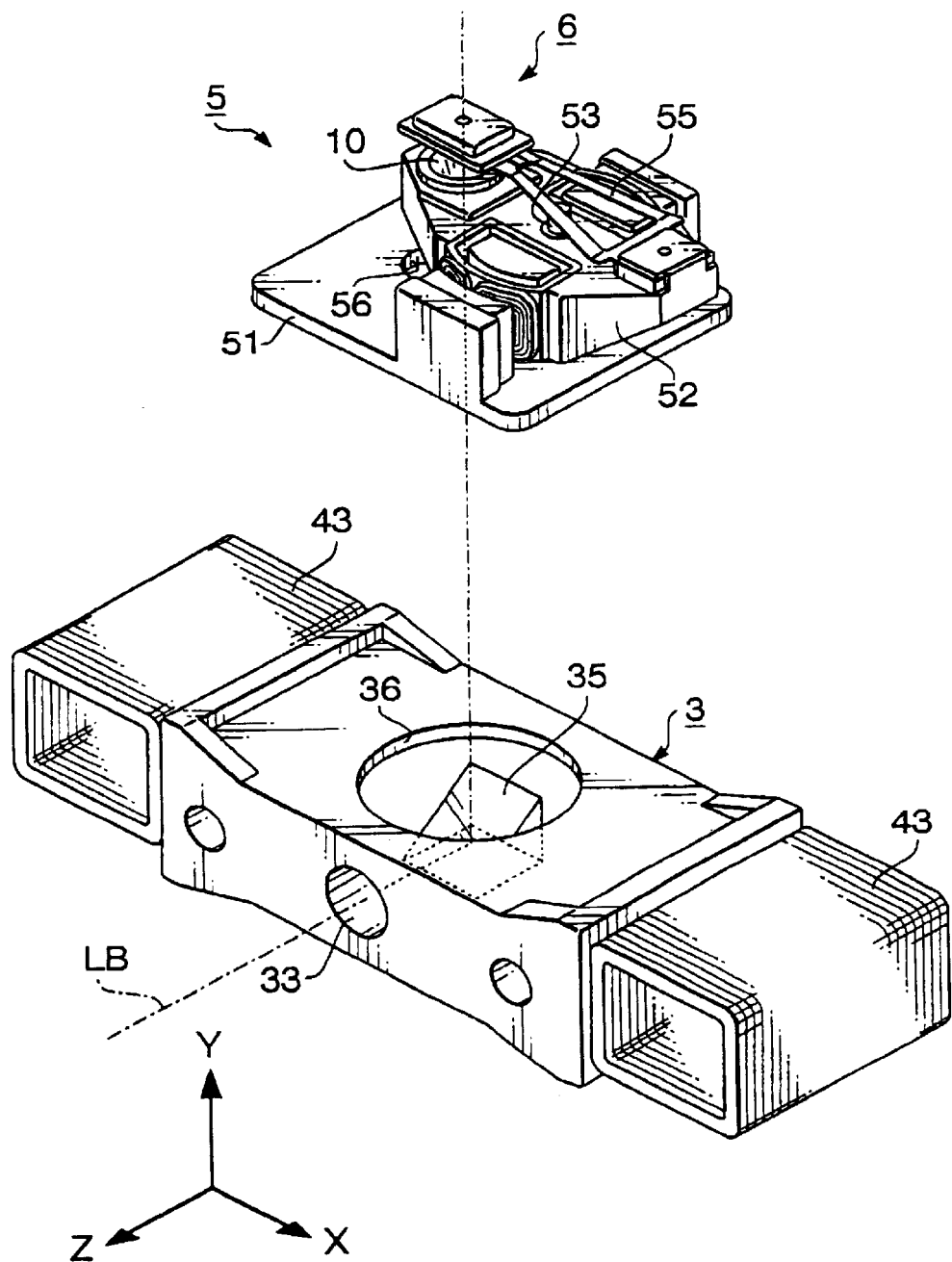
FIG. 3 is a exploded perspective view of a lens actuator and a carriage.

The laser beam LB (see FIG. 2) is emitted from the optical unit 4 in the Z-axis direction, Therefore, the laser beam is always incident on the carriage 3 regardless of the position of the carriage 3 in the Z-axis direction FIG. 3 shows an exploded perspective view of the carriage 3 and the lens actuator S.

The lens actuator 5 is provided with an actuator base 51, which is a plate member secured on the upper surface of the carriage 3, and an objective lens holder 52, which is located above the actuator base 51. The objective lens holder 52 is slidable along a shaft 53 mounted on the actuator base 51. The shaft 53 extends in the Y-axis direction. The shaft 53 has a circular cross section, and the objective lens holder 52 is rotatable about the shaft 53.

The objective lens holder 52 is formed with a lens frame 54 to which the objective lens 10 is supported (see FIG. 6). The lens frame 54 is a through hole, which is parallel with the shaft 53, and apart therefrom by a predetermined distance. In other words, the objective lens 10 is held by the objective lens holder 52, with the optical axis thereof being parallel with the shaft 53 and shifted therefrom by the predetermined amount.

As shown in FIG. 3, the carriage 3 is formed with an opening 33 for allowing the laser beam emitted by the optical unit 4 to pass through, a mirror 35 for deflecting the laser beam passed through the opening 33 (i.e., along the Z-axis direction) to the Y-axis direction, and an opening 36 for allowing the laser beam deflected by the mirror 35 to pass through. The laser beam reflected by the mirror 35 and passed through the opening 36 passes through a through hole 56 (see FIGS. 3 and 4) formed on the actuator base 51, and is incident on the objective lens 10. By the objective lens 10, the laser beam, which is a parallel beam, is converged on the recording surface 2a of the optical disc 2.

On the upper surface of the objective lens holder 52, a floating type magnetic head 6 is mounted via a load beam 55, which is an elastic member extending in the X-axis direction. The magnetic head 6 is arranged between the lens 6 and the optical disc 2.

The magnetic head 6 is provided with a coil 61 which applies magnetic field on the recording surface 2a of the optical disc 2 when data is to be recorded on the optical disc 2. At the center of the coil 61, an opening 62 is formed for allowing the converged light beam emerged from the objective lens 10 to pass through. An end portion C of the load beam 55 along the X-axis direction is fixed to the floating type magnetic head 6, and the other end portion B of the load beam 55 is secured to the objective lens holder 52. Both end portions of the load beam 55 are located at positions symmetrical with respect to the shaft 53.

Figure 4:
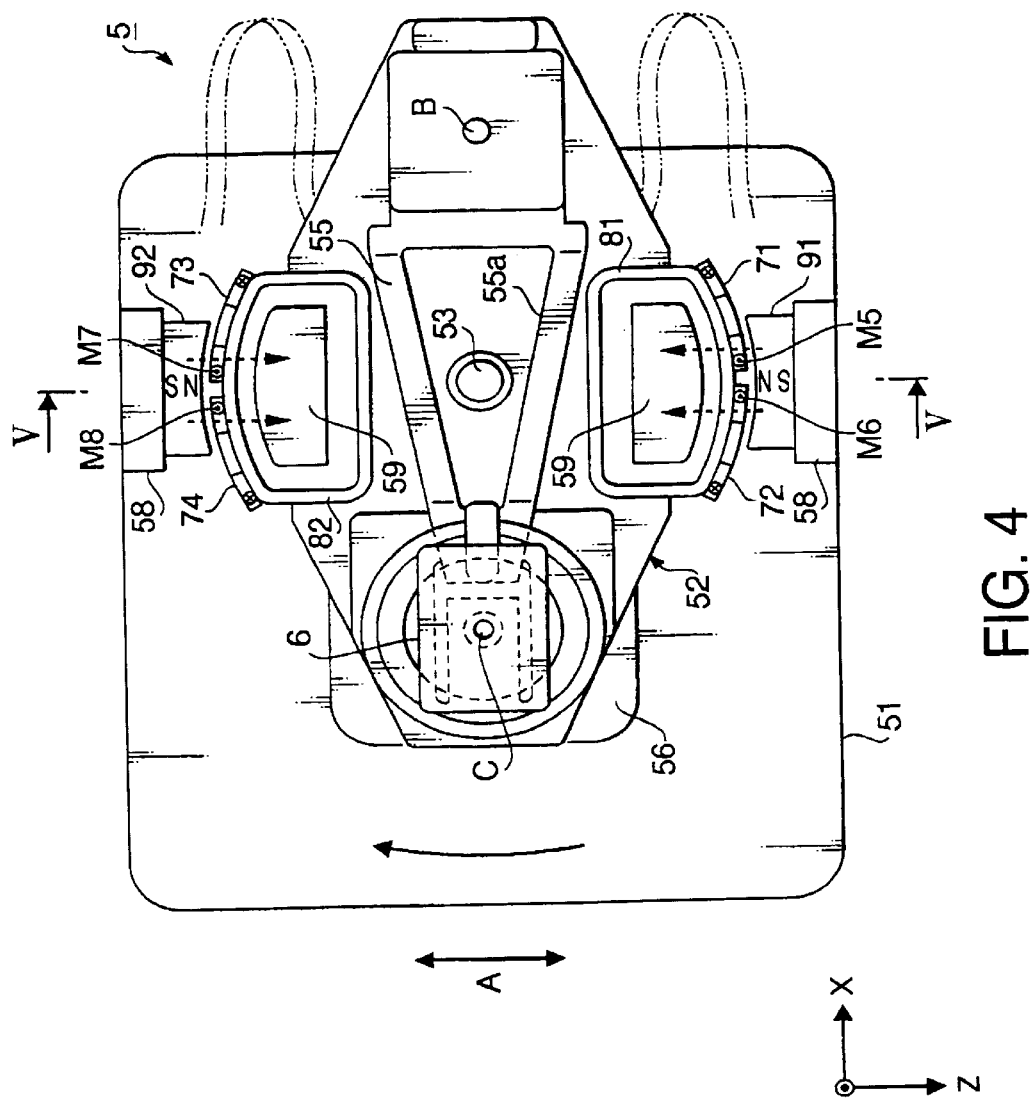
FIG. 4 is a top view of the lens actuator.
Figure 5:
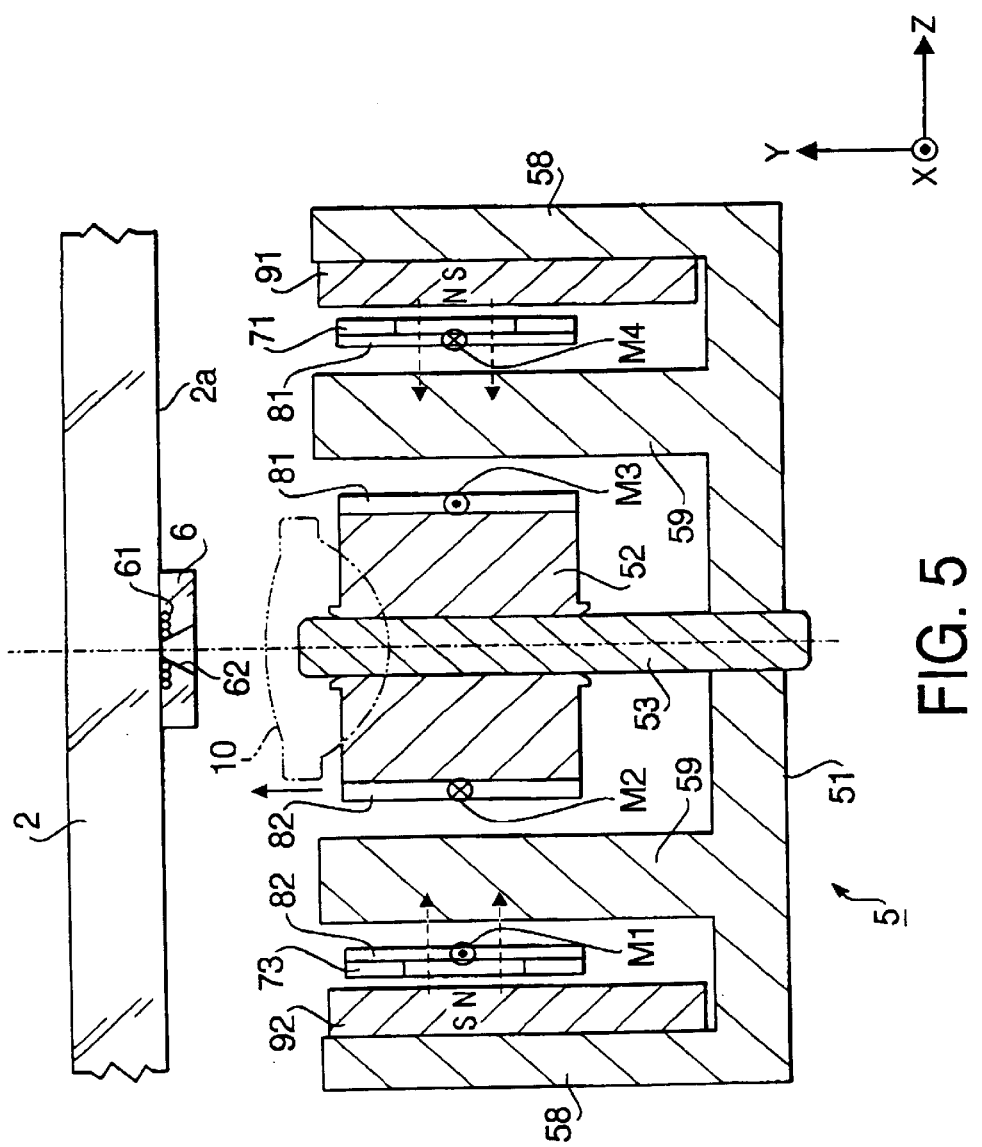
FIG. 5 is a cross sectional view of the lens actuator taken along line V—V of FIG. 4.

FIG. 4 is a top view of the lens actuator 5, and FIG. 5 is a cross sectional view of the lens actuator 5 taken along line V—V of FIG. 4. The lens actuator 5 employs a moving coil system, and is capable of moving the objective lens holder 52 in the Y-axis direction, along the shaft 53, and of rotating the objective lens holder 52 about the shaft 53.

In FIG. 4, a direction where the carriage 3 moves (i.e., the radial direction of the optical disc 2, or the Z-axis direction) is indicated by arrow A. On both sides of the objective lens holder 52 in the Z-axis direction, a pair of elevation coils (focusing coils) 81 and 82 for moving the lens holder in the Y-axis direction along the shaft 53 are provided around-.center yokes 59 and 59. The focus coils 81 and 82 are formed such that a wire is turned on the X-Z plane so that the magnetic field in the Y-axis direction is generated.

On the actuator base 51, a pair of permanent magnets 91 and 92 are provided with the objective lens holder 52 arranged therebetween along the X-axis direction. The permanent magnets 91 and 92 are secured to support members 58 and 58 provided on the actuator base 51. The permanent magnets 91 and 92 are arranged such that the N (North) pole faces the objective lens holder 52. It should be noted that the focusing coils 81 and 82 are arranged symmetrically with respect to the shaft 53.

When the electrical current runs through the focus coils 81 and 82 in a direction indicated by symbols M1–M4 in FIG. 5, due to interaction between the magnetic field generated by the permanent magnets 91 and 92 and the electrical current flowing through the focusing coils 81 and 82, a force for lifting the focusing coils 81 and 82 (i.e., moving the same towards the optical disc 2) in the Y-axis direction is generated, and thus, the objective lens holder 52 is lifted (i.e., moved toward the optical disc 2). If the electrical current in the opposite direction runs through the focus coils 81 and 82, the objective lens holder 52 moves downward (i.e., moves away from the optical disc 2). Thus, by controlling the electrical current running through the focus coils 81 and 82, the objective lens holder 52 can be moved in the Y-axis direction (i.e., moved along the shaft 53). By controlling the electrical current running through the focus coils 81 and 82 to move the objective lens in the Y-axis direction, focusing condition can also be adjusted.

Figure 6A:
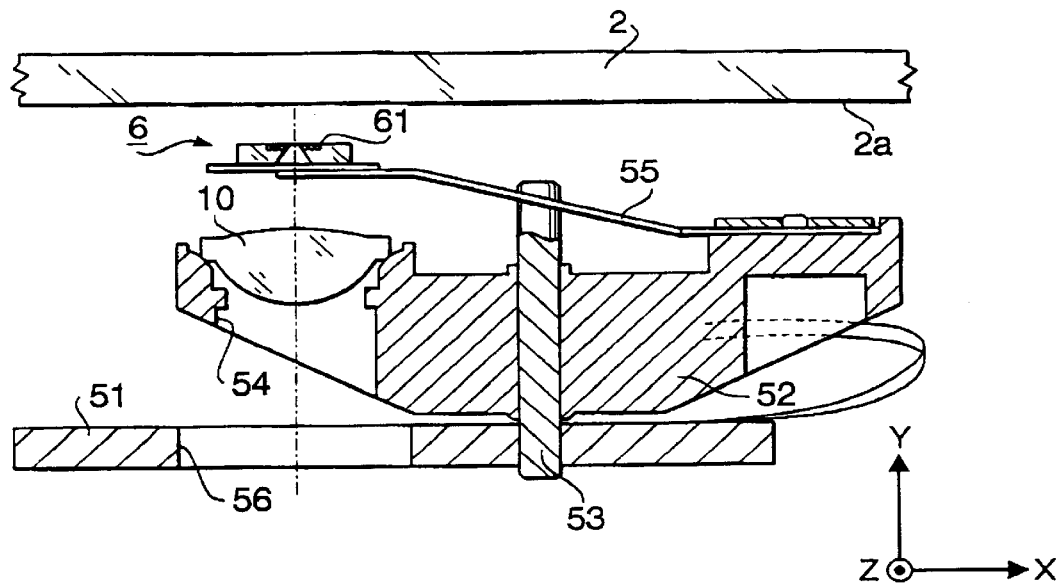
FIGS. 6A and 6B are cross sectional views illustrating up/down movement of the lens actuator.
Figure 6B:
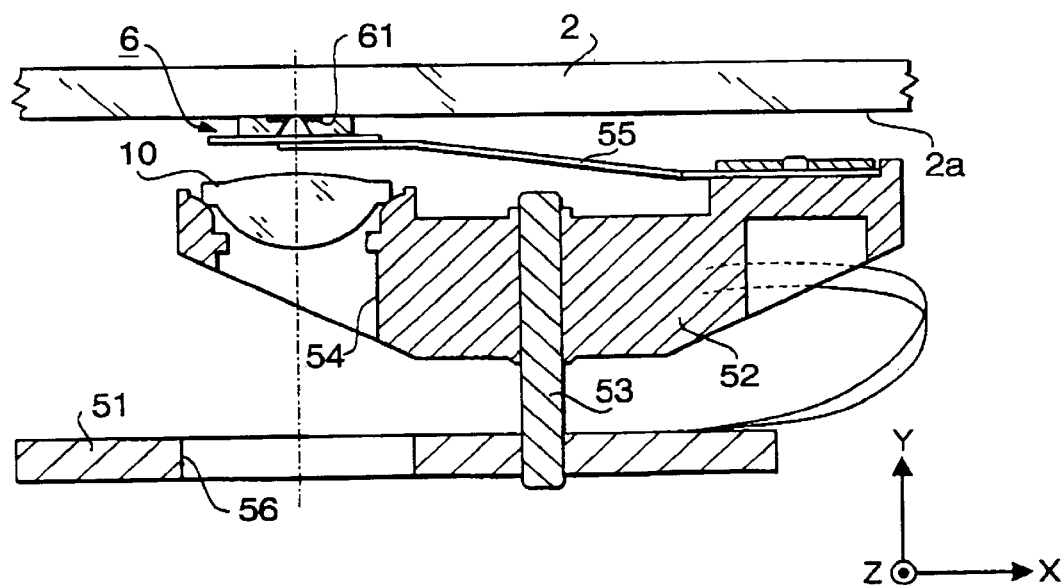

Each of FIGS. 6A and 6B is a side view showing the objective lens holder 52 when it is moved. As shown in FIG. 6A, when the objective lens holder 52 is retracted from (i.e., located away from) the optical disc 2, the objective lens holder 52 is seated on the actuator base 51. In this situation, the magnetic head 6 is also retracted (i.e., apart) from the optical disc 2. Accordingly, even if the optical disc 2 is loaded/unloaded, the surface of the optical disc 2 may not touch the magnetic head 6. It should be noted that, in order to prevent the load beam 55 from colliding with the shaft 53, a triangular opening 55a (see FIG. 4) for allowing the shaft 53 to pass through is formed.

When data is to be recorded on the optical disc 2, or when data is read out of the optical disc 2, the focusing coils 81 and 82 are energized and the objective lens holder 52 is lifted as shown in FIG. 6B. In order to locate the focal point of the objective lens 10 on the recording surface 2a of the optical disc 2, the focus coils 81 and 82 are further driven in accordance with the signals output by data detection/servo signal detection sensor 24 and a focus servo circuit (not shown).

When the objective lens holder 52 is lifted as shown in FIG. 6B, the magnetic head 6 is biased, by elasticity of the load beam 55, towards the optical disc 2. An air flow is caused by revolution of the optical disc 2, and due to the air flow, the floating type magnetic head 6 is floated by a small amount with respect to the recording surface 2a of the optical disc 2. It should be noted that the magnetic head 6 follows the displacement of the level, in the Y-axis direction, of the recording surface 2a of the revolving optical disc 2.

When the recording (or reproducing) operation is finished, the optical disc 2 is stopped from revolving. The focus coils 81 and 82 are energized so that the objective lens holder 52 moves apart from the recording surface 2a of the optical disc 2 as shown in FIG. 6A.

For the fine tracking, in the embodiment, the objective lens 10 is moved on a plane parallel to the X-Z plane. As shown in FIGS. 4 and 5, in order to rotate the objective lens holder 52 about the shaft 53, a pair of rotation coils (hereinafter, referred to as tracking coils) 71 and 72 are provided to the focusing coil 81 on a surface facing a permanent magnet 91. The tracking coils 71 and 72 turn in a plane substantially parallel to a North pole side surface of the permanent magnet 91, and at a position where the tracking coils 71 and 72 face the magnet 91, the electrical current flows in the Y-axis direction. Similarly, on the permanent magnet 92 side of the focus coil 82, a pair of tracking coils 73 and 74 are fixed. The tracking coils 71 and 72, and the tracking coils 73 and 74 are arranged symmetrically with respect to the shaft 53.

When the electrical current flows through the tracking coils 71 and 72 in a direction indicated by symbols M5 and M6 in FIG. 4, due to interaction between the magnetic field of the permanent magnet 91 and the electrical current, a force moving the tracking coils 71 and 72 to the left-hand side in FIG. 4 is applied. When the electrical current flows in the tracking coils 73 and 74 in a direction indicated by symbols M7 and M8 in FIG. 4, due to interaction between the magnetic field of the permanent magnet 92 and the electrical current, a force moving the tracking coils 73 and 74 to the right-hand side in FIG. 4 is applied. Since the tracking coils 71 and 72, and 73 and 74, which are symmetrically arranged with respect to the shaft 53, the objective lens holder 52 rotates in a clockwise direction about the shaft 53 in FIG. 4. As above, by controlling the electrical current running through the tracking coils 71, 72, 73 and 74, the objective lens holder 52 can be rotated about the shaft 53.

It should be noted that, surfaces on the North pole side of the permanent magnet 91 and 92 are formed to be concave surface allowing the tracking coils 71–74 to rotate without being interfered by the North pole side surfaces of the permanent magnets 91 and 92.

As described above, there are two electromagnetic systems:

a first system, which includes the coils 81 and 82 and the permanent magnets 91 and 92, moves the lens holder in the Y-axis direction, along the shaft 53; and a second system, which includes the coils 71–74 and the permanent magnets 91 and 92, rotates the lens holder on a plane parallel to the X-Z plane, about the shaft 53.

By rotating the objective lens holder 52, the optical axis of the objective lens 10 can be shifted. Accordingly, the position of the beam spot, which formed on the recording surface 2a of the optical disc 2 by the objective lens 10, can be adjusted precisely on a recording track. That is, in this embodiment, the rough tracking is performed by moving the carriage 3 in the Z-axis direction, and by rotating the objective lens holder 52, the fine tracking is performed. The rotation angle of the objective lens holder 52 is detected with an angle detector (not shown) arranged in the vicinity of the objective lens holder 52.

As described above, in the optical disc drive 1 according to the embodiment, movement of the magnetic head 6 between the operation/retracted positions, fine tracking operation, and focusing operation can be performed using a single unit (the lens actuator 5). Thus, the optical disc drive can be made simple, and can be manufactured less costly.

Further, as shown in the FIG. 4, the end portion B of the load beam 55, which is fixed to the objective lens holder 52, and the end portion C of the load beam 55, which is fixed to the magnetic head 6, are located at positions symmetrical with respect to the shaft 53. Therefore, the magnetic head 6 is always located above the objective lens 10, even if the objective lens holder 52 is rotated about the shaft 53 for fine tracking. This will be described with reference to FIGS. 7A and 7B.

Figure 7A:
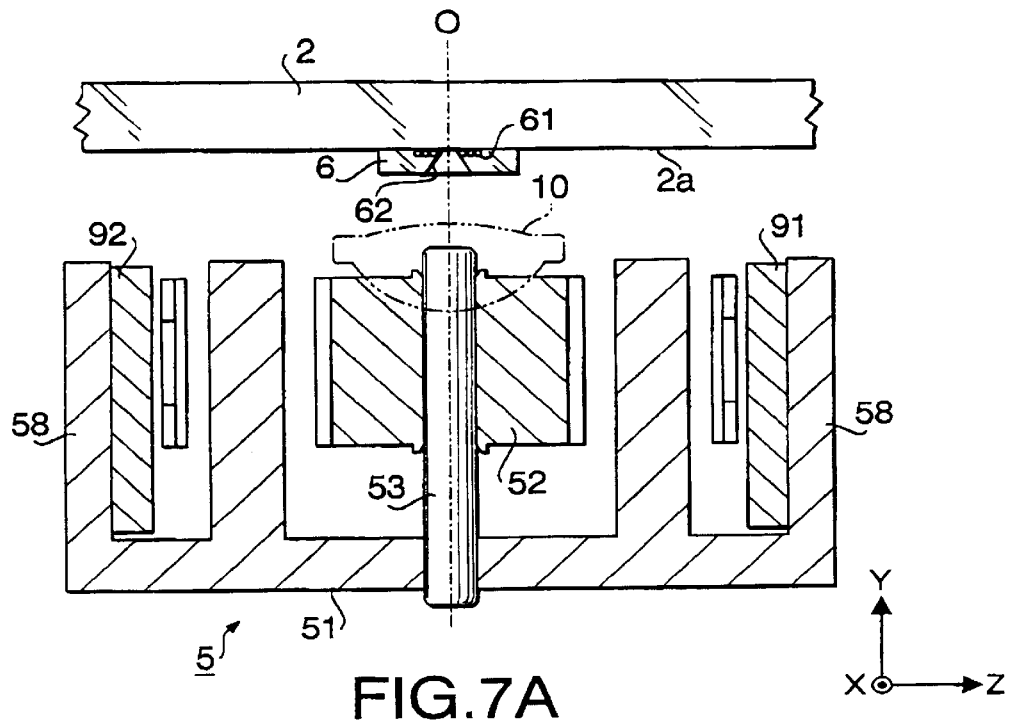
FIG. 7A shows a positional relationship between the objective lens and the magnetic head when the fine tracking has not yet been executed.
Figure 7B:
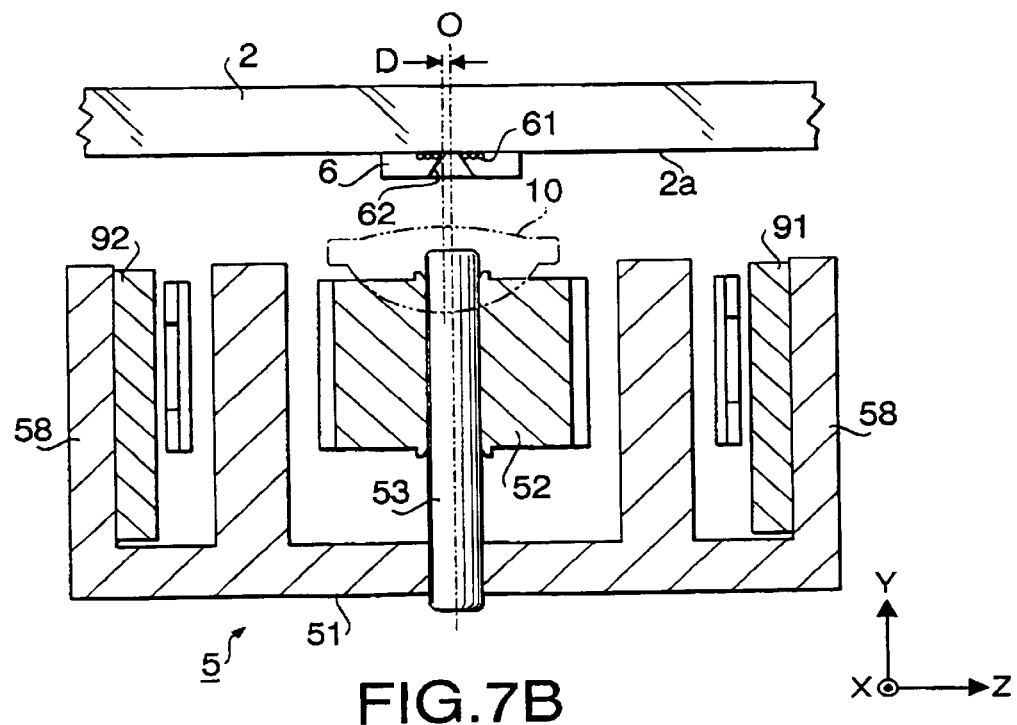
FIG. 7B shows a positional relationship between the objective lens and the magnetic head when the fine tracking has been executed.

FIG. 7A shows a condition where the fine tracking has not yet been executed, while FIG. 7B shows a condition where the fine tracking has been executed. In FIG. 7B, the objective lens 10 has been displaced by amount D. Since the magnetic head 6 is mounted on the objective lens holder 52, the magnetic head 6 has been moved by the same amount, i.e., the positional relation between the objective lens 10 and the magnetic head 6 does not change, even if the fine tracking operation is performed.

In this embodiment, the magnetic head 6 is formed with the opening 62 for allowing the collimated beam from the objective lens 10 to pass through. Since the positional relationship between the objective lens 10 and the magnetic head 6 does not change, the light beam from the objective lens 10 passes through the opening 62 without vignetting.

If the positional relationship between the objective lens 10 and the magnetic head 6 changes due to the fine tracking, the diameter of the opening 62 must be made larger to avoid vignetting. In such a case, however, the number of turns of the wire should be made larger, since a distance between the beam spot on the recording surface 2a of the optical disc 2 and the wire of the coil 61 on a plane parallel to the recording surface 2a becomes greater. According to the embodiment described above, the opening 52 need not be made larger, since the positional relationship between the objective lens 10 and the magnetic head 6 remains unchanged even when the fine tracking is executed.

Finally, the optical unit 4 will be described.

As shown in FIG. 2, in the optical unit 4, a laser diode 18, a collimating lens 20, a composite prism assembly 21, an imaging toric lens 23, a data detection/servo signal detection sensor 24, and an APC sensor 25 are provided.

The diverging laser beam emitted by the laser diode 18 is collimated by the collimating lens 20. The cross-sectional shape of the collimated beam is elliptic because of the nature of the laser diode 18. The cross-sectional shape is not suitable for forming a small beam spot on the optical disc 2, thus, the beam is converted to a beam having a substantially circular cross-sectional shape. For this purpose, a beam receiving surface 21a of the composite prism assembly 21 is inclined with respect to the incident beam and converts the cross-sectional shape of the incident beam (the collimated beam) from an elliptical shape to a substantially circular shape by refracting the incident beam.

In the optical unit 4, a deflection mirror 26 is further provided for directing the laser beam that emerged from the composite prism assembly 21 to the carriage 3.

The laser beam reflected by the optical disc 2 returns along the same path taken toward the optical disc 2, and enters the composite prism assembly 21. A half mirror surface 21b of the composite prism assembly 21 separates the laser beam from the optical disc 2 into a passing beam which passes through the half mirror surface 21b, and a reflected beam which is reflected by the half mirror surface 21b and directed toward the data detection/servo signal detection sensor 24. The data detection/servo signal detection sensor 24 is a composite sensor that reads data recorded on the optical disc 2, and further, generates focusing error signal and tracking error signal. More specifically, the focusing error signal and the tracking error signal are generated by a head amplifier (not shown) in accordance with the signals output by the sensor 24, and transmitted to the control circuit and the data processing circuit.

For the focusing operation described above, the imaging toric lens 23 is formed to have astigmatism such that the data detection/servo signal detection sensor 24 generates the focus error signal in accordance with an astigmatism method. As a result of the focusing operation, the distance between the recording surface of the optical disc 2 and the objective lens holder 52 is kept constant, and accordingly, the distance between the magnetic head 6 and the recording surface 2a of the optical disc 2 is kept constant.

As described above, according to the embodiment, movement of the magnetic head 6 between the operation/retracted positions, fine tracking operation, and focusing operation can be performed using a single unit. Thus, the optical disc drive can be made simple, and can be manufactured less costly.

The present disclosure relates to the subject matter contained in Japanese Patent Application No. HEI 10-257712, filed on Sep. 11, 1998, which is expressly incorporated herein by reference in its entirety.

What is claimed is:

1. An optical disk drive, comprising:
   a light source unit that emits a collimated light beam;
   a carriage mounting an objective lens for converging the collimated light beam on a recording surface of an optical disc, said carriage being movable in a direction traversing data tracks of said optical disc;
   a lens actuator mounted on said carriage, said lens actuator having a movable unit, said movable unit being capable of moving said objective lens in first and second directions, independently, said first direction being a direction of an optical axis of said objective lens, said second direction being a direction on a plane parallel to the data recording surface of said optical disc; and
   a magnetic head mounted on said movable unit of said lens actuator, said magnetic head being capable of applying a magnetic field to said data recording surface of said optical disc when data is to be recorded on said optical disc.

2. The optical disc drive according to claim 1, wherein said magnetic head is mounted on said movable unit via an elastic member.

3. The optical disc drive according to claim 2, wherein said magnetic head is biased toward the data recording surface of said optical disc by said elastic member, said magnetic head being located slightly apart from the data recording surface of said optical disc due to an air flow caused by revolution of said optical disc.

4. The optical disc drive according to claim 1, wherein a rough tracking is performed by moving said carriage in the direction traversing the data tracks of said optical disc, and wherein fine tracking is performed by moving said movable unit in the plane parallel to the data recording surface of said optical disc. position at which said objective lens is retracted from said operation position.

5. The optical disk drive according to claim 1, wherein said movable unit is movable in said first direction to locate said objective lens between an operation position in which data is one of recorded and reproduced, and a retracted position in which the data is not recorded or reduced, said operation position being a position at which the beam emitted by the light source is converged on the data recording surface, and said retracted position being a position at which said objective lens is retracted from said operation position.

6. The optical disc according to claim 5, wherein said magnetic head is located at an operation position which is closely adjacent to the data recording surface of said optical disc when said objective lens is located at the operation position, and at a retracted position which is away from the data recording surface of said optical disc when said objective lens is located at the retracted position.

7. The optical disc according to claim 5, wherein focusing is executed by moving said movable unit in said first direction.

8. The optical disc according to claim 1,
   wherein said lens actuator further includes an actuator base mounted on said carriage,
   wherein said movable unit comprises a lens holder for holding said objective lens, and
   said lens actuator further comprises a shaft standing on said actuator base, said shaft extending in a direction parallel to the optical axis of said objective lens, said lens holder being rotatably and slidably supported by said shaft.

9. The optical disc drive according to claim 8, wherein said lens actuator comprises:

a first electromagnetic system for moving said lens holder in said first direction; and a second electromagnetic system for rotating said lens holder about said shaft.

10. The optical disc drive according to claim 7, wherein the optical axis of said objective lens is parallel to and displaced from the central axis of said shaft by a predetermined amount.

11. The optical disc drive according to claim 1, wherein said carriage is movable in a radial direction of said optical disc.

12. The optical disc drive according to claim 8, wherein said magnetic head is mounted on said lens holder.

* * * * *